Nov. 7, 1967   G. L. BRETTON   3,351,301
FISHING REELS PROVIDED WITH A HOOD
Filed Sept. 28, 1965   4 Sheets-Sheet 1

Inventor:
Georges Louis Bretton
by
Edwin E. Greigg

Nov. 7, 1967    G. L. BRETTON    3,351,301
FISHING REELS PROVIDED WITH A HOOD
Filed Sept. 28, 1965    4 Sheets-Sheet 2
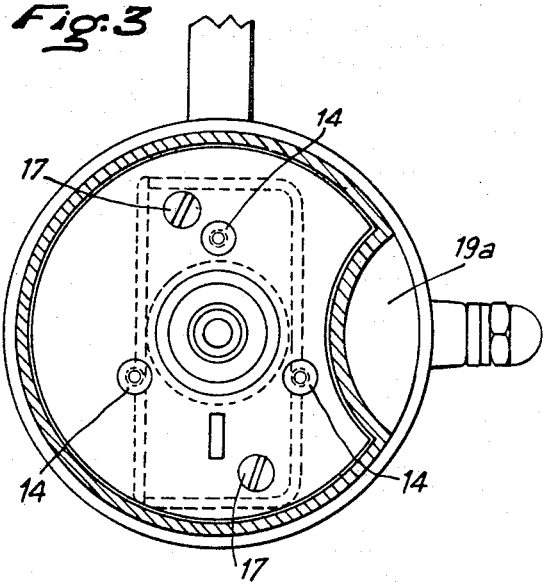
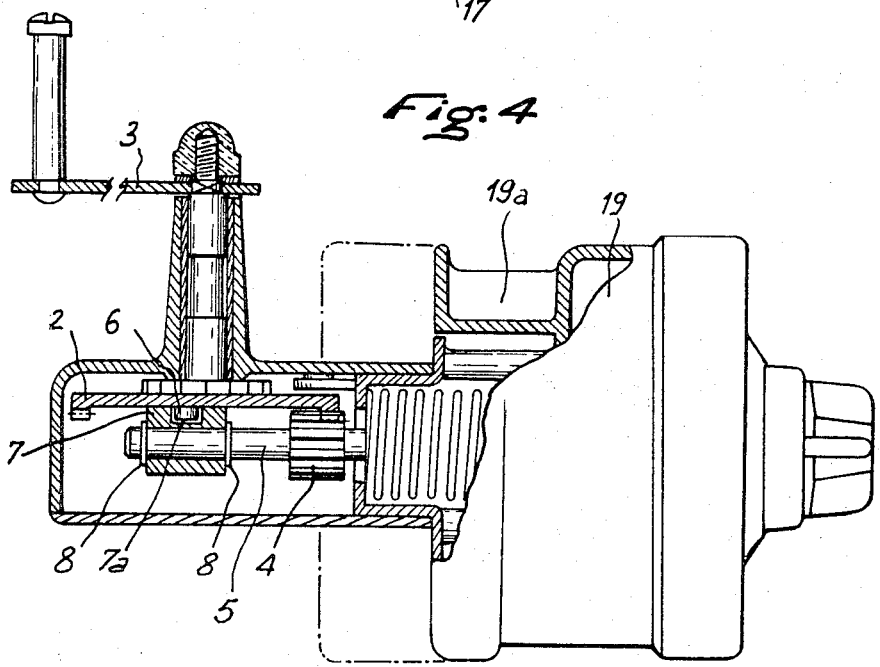

Nov. 7, 1967

G. L. BRETTON 3,351,301

FISHING REELS PROVIDED WITH A HOOD

Filed Sept. 28, 1965

Nov. 7, 1967    G. L. BRETTON    3,351,301
FISHING REELS PROVIDED WITH A HOOD
Filed Sept. 28, 1965    4 Sheets-Sheet 4
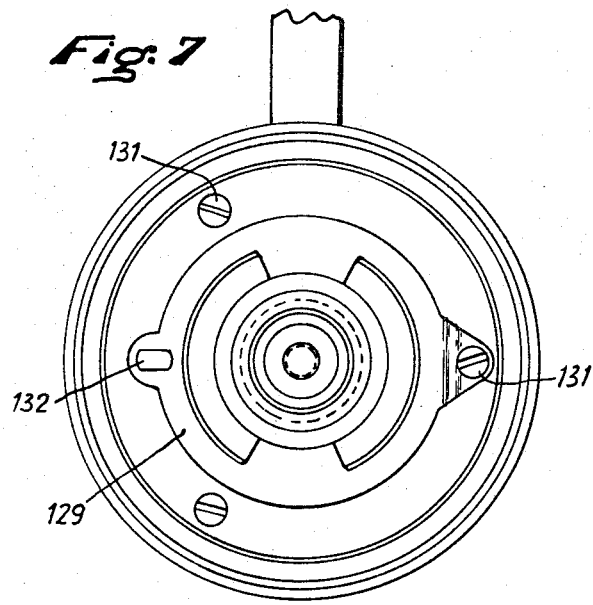
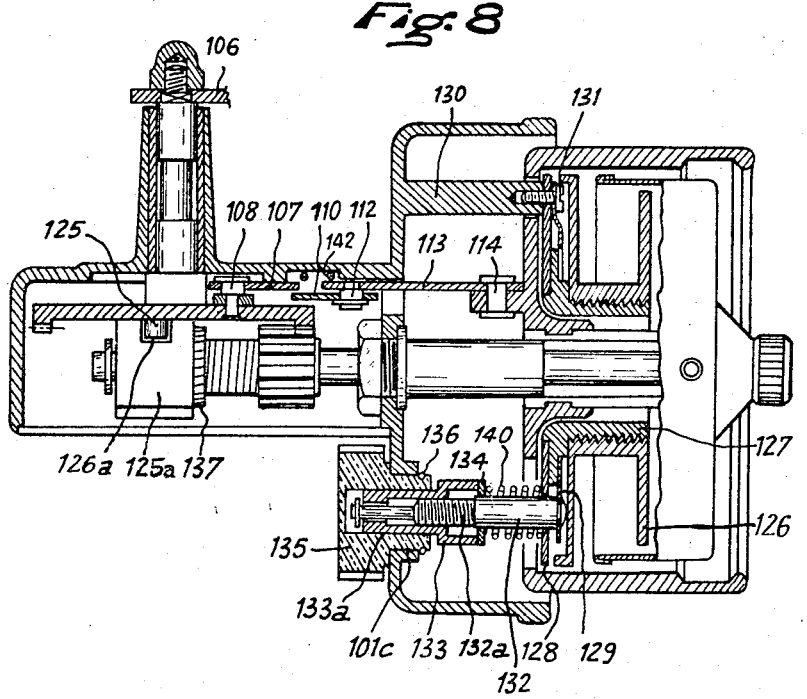

United States Patent Office 3,351,301
Patented Nov. 7, 1967

3,351,301
FISHING REELS PROVIDED WITH A HOOD
Georges Louis Bretton, 1 Rue Achille Benoit,
Cluses, France
Filed Sept. 28, 1965, Ser. No. 490,827
Claims priority, application France, Oct. 10, 1964,
991,022
11 Claims. (Cl. 242—84.21)

ABSTRACT OF THE DISCLOSURE

This spinning reel includes a spool reciprocated through a normal range for evenly distributing line wrapped thereabout by a rotating flyer having a pickup pin movable between a projected position across the line during winding and a retracter position clear of the line during casting. To condition the line for casting the hood is moved rearwardly either manually or by reverse rotation of the drive acting through appropriate linkage to withdraw support from the pickup pin so that it may be retracted below the periphery of the flyer to allow unwinding of the line until the flyer is again rotated in the winding direction to project the pickup pin.

My invention has for its object an improved fishing reel ensuring an axial unwinding and it concerns more particularly those reels provided with a hood wherein the spool, around which the fishing line is stored, is protected by a hood surrounding it so as to provide between its inner wall and the front edge of the spool a narrow annular gap through which the fishing line may pass.

This arrangement cuts out the entanglement between the convolutions of the fishing line and the inconveniences arising therethrough and which are well-known to all anglers. However, this hood has the drawback of imposing a considerable braking stress on the unwinding of the fishing line at the moment of the casting of the bait.

My invention eliminates this drawback and it covers for this purpose a fishing reel ensuring an axial unwinding, said reel of the type including a hood being novel through the fact that the hood is adapted to slide axially between a forward or rewinding position during which it caps the spool and a receding or casting position at which time its front edge is located to the rear of the front edge of the spool so as to release the path to be followed by the fishing line during the casting operation.

This arrangement allows in particular obtaining a normal unwinding of the fishing line without the latter being subjected to any friction against the inner surface of the hood.

Figure 1:
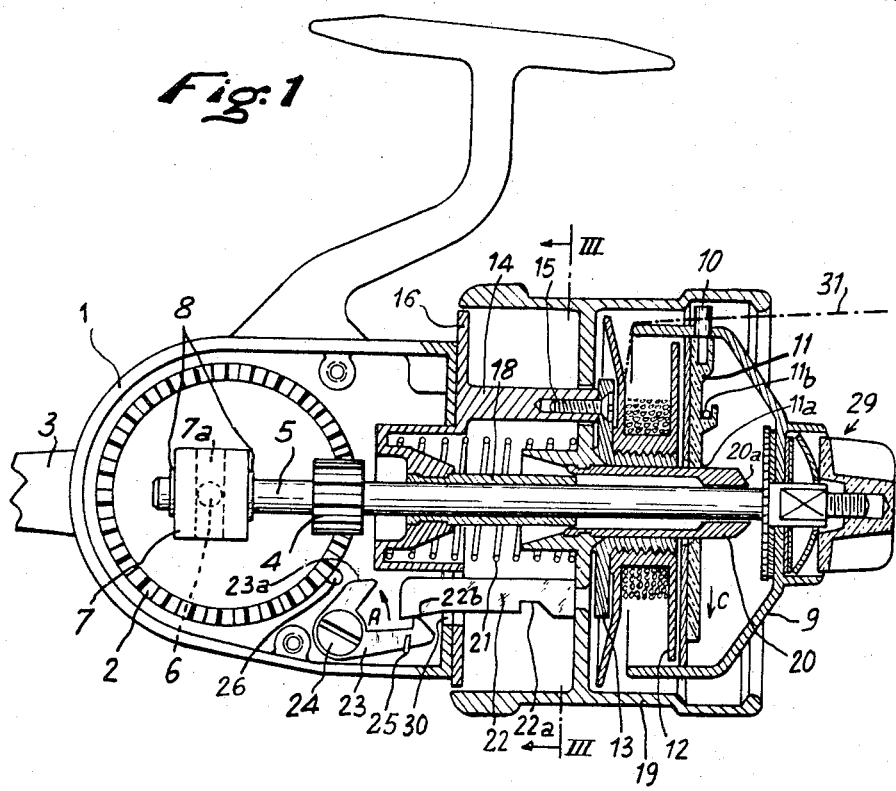
Figure 2:
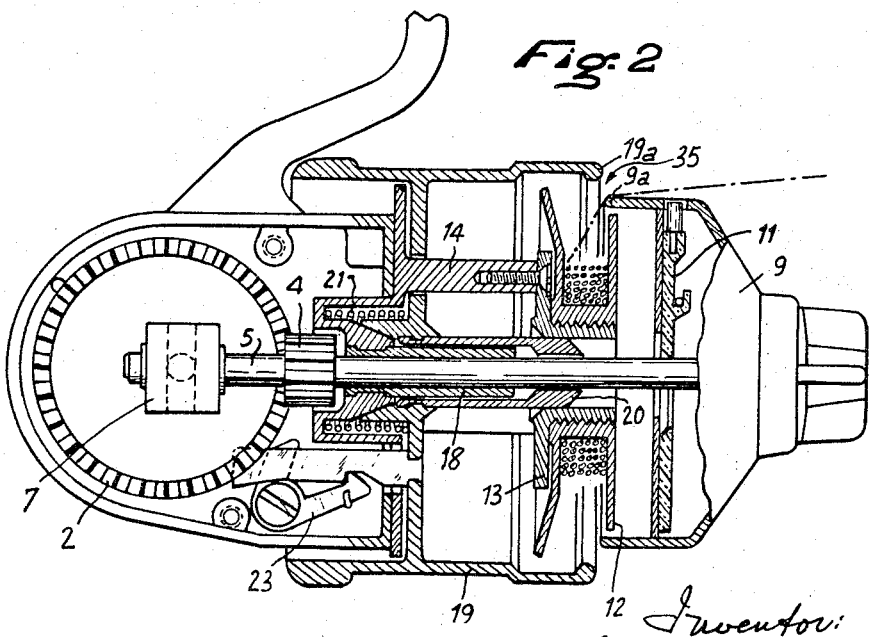
Figure 5:
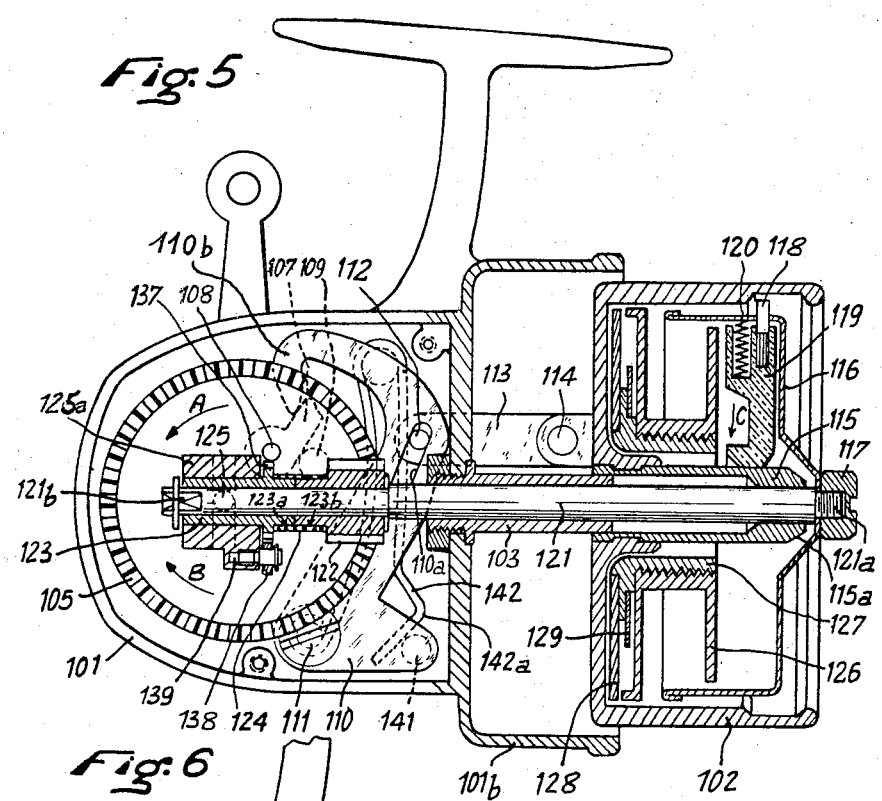

My invention will be readily understood from the reading of the following description, reference being made to the accompanying drawings wherein:

FIGS. 1 and 2 are axial cross-sections of a fishing reel according to my invention, FIG. 1 corresponding to the line-rewinding position while FIG. 2, part of which is an elevational view, shows the reel in its casting position, FIG. 3 is a cross-section through line III—III of FIG. 1, FIG. 4 is an axial cross-section, partly elevational, through the upper part of FIG. 1, FIGS. 5, 6, 7, 8 are views, similar respectively to the corresponding FIGS. 1, 2, 3 and 4, illustrating a further embodiment.

Turning to FIGS. 1 to 4, my improved reel is shown as including a casing 1 enclosing a driving wheel 2 driven by a crank 3. The wheel 2 actuates a pinion 4 mounted rigid with the spindle 5 so as to transmit to the latter a rotary movement. Said spindle 5 revolves inside the hub 7 with reference to which its longitudinal position is defined by means of two elastic clamping members 8 positioned in corresponding grooves formed in said spindle. The hub constrains the spindle 5 to execute a translational movement by means of a stud 6 eccentrically secured to the wheel 2 and cooperating with a groove 7a in the hub 7. The end of the spindle 5 carries a bell-shaped flyer member 9 frictionally secured thereon by means of the braking system 29, said bell-shaped member being provided with a radially projectable pin 10 made of a very hard metal and rigid with a slider 11 adapted to slide radially with reference to said bell-shaped member. Said arrangement 4, 5, 9 assumes thus a rotary and translational movement and forms a guide for the fishing line.

The spool 12 is screwed over the spool hub 13 so as to allow its replacement through mere unscrewing. The spool hub 13 is secured to three longitudinal bars 14 through three corresponding screws 15. These three bars 14 are rigid with a plate 16 secured to the front of the casing 1 by two further screws 17. Said plate 16 carries centrally a bush 18 for the spindle 5. A movable hood 19 carries at its center a sleeve 20 rigid with it and provided with a frustoconical end 20a. Said sleeve is adapted to slide longitudinally over the bush 18 and spindle 5 and also with reference to the three bars 14 passing through three openings provided in the hood so as to oppose the rotation of the latter round the axis of the spindle. The hood is held in the spool-engaging position illustrated in FIG. 1 corresponding to rewinding by the spring 21 acting against compression.

The slider 11 is provided with an aperture 11a through which the sleeve 20 passes when the reel is in its above-mentioned rewinding position and it is subjected to the action of a spring 11b urging said slider in the direction of the arrow c, that is towards the position corresponding to a radial withdrawal of the projection 10.

On the other hand, the hood 19 is provided with a notch 19a (FIG. 3) which allows controlling the receding movement of the hood against the spring 21 through one finger of the operator's left hand, say the thumb or the forefinger.

Lastly, the hood 19 is rigid with a substantially longitudinal projection 22 extending into the casing 1 through the port 30. Said projection is provided with a notch 22a cooperating with a catch 23 pivotally secured to the casing at 24 and urged into a pivotal movement in the direction of the arrow A (FIG. 1) by the spring 25. The catch is rigid with a cam-shaped projection 23a designed in a manner such as to cooperate with a stud 26 carried by the gear 2, when the catch 23 has engaged the notch 22a in the projection 22.

The arrangement described operates as follows: When the reel is in its rewinding position, (FIG. 1), the hood 19 is held in abutting relationship with the spool hub 13 under the action of the spring 21. For said position, the sleeve 20 passes through the perture 11a in the slider, which is thus held in position against the spring 11b as illustrated in FIG. 1, and for this position the projectable pin 10 extends outwardly of the bell-shaped member 9 and cooperates in the rewinding of the fishing line when said bell-shaped member revolves under the action of the crank 3.

In order to allow a casting of the bait when the rewinding is at an end, it is sufficient to push the hood 19 so as to urge it rearwardly; the longitudinal projection 22 enters then further into the casing 1 and, at the end of its travel, the catch 23 drops into the notch 22a and holds thus the hood in its extreme receding position as illustrated in FIG. 2.

During this operation, the fisher has held the fishing line 31 fast in a conventional manner through the forefinger of his right hand so as to prevent the untimely unwinding of the fishing line during the withdrawal of projection 10. Withdrawal of said pin is obtained through the receding movement of the sleeve 20 which is rigid with the hood, the receding movement of the sloping end surface 20a of the sleeve inside the hub of the spool thus releasing the slider 11 which moves then in the direction of the arrow c under the action of a spring 11b. This results in the withdrawal of the projection 10 into the inside of the bell-shaped member.

The fishing reel is then ready for casting. In the position assumed by it after its receding movement, the hood leaves open an annular gap 35 (see FIG. 2) extending between its front edge 19a and the rear edge 9a of the bell-shaped member, which allows the fishing line to be unwound in the usual manner without being subjected to any friction against the inner wall of said hood.

At the beginning of the recovery of the fishing line and as soon as the crank has been turned through one revolution, the stud 26 strikes the cam 23a and causes it to have a rocking movement and this results in a release of the catch 23 from the longitudinal projection 22 and this causes the hood 19 to move forwardly under the action of spring 21. During this movement, the passage of the frustoconical front end 20a of the sleeve through the perforation 11a in the slider causes the latter to return into its original position illustrated in FIG. 1 and consequently this urges the radial projection 10 outwardly of the bell-shaped member 9. It is therefore sufficient for the fisherman to continue turning the crank 3 so as to obtain the winding of the fishing line 31 round the drum or spool 12.

In order to eliminate any slight friction between the stud 26 and the cam 23a once per revolution of the crank, there is provided on the longitudinal projection 22 a sloping surface 22b, the part played by which consists in urging slightly the cam 23 away from the path traversed by the stud 26 when the hood has reached its rearmost position illustrated in FIG. 2.

FIGS. 5 to 8 illustrate an improved embodiment wherein the receding movement of the hood is obtained through a mere rearward movement of the driving crank over about one quarter of a revolution.

In said embodiment, the casing 101 includes at its front end an extension forming a dished part 101b enclosing the hood 102, said hood enclosing in its turn the spool 126 and being adapted to slide over the sleeve 103 carrying inside it the spindle 121 driving the bell-shaped member 116 guiding the fishing line.

Said bell-shaped line-guiding member 116 is rigidly secured to the spindle 121 as provided by its flat terminal surface 121a engaged by the nut 117 threaded over the spindle. Said spindle 121 assumes a rotary and translational movement which is obtained as follows: the toothed wheel 105 drives the pinion 122, which latter includes a cylindrical section 123b loosely fitted over the spindle 121.

A member 123 revolves in unison with the spindle 121 as provided by the flat surface 121b formed thereon. Said member includes a cylindrical section 123a and is secured to the pinion 122 by the spring 124 acting frictionally in a manner such that when the crank is caused to turn in the normal direction corresponding to a recovery of the fishing line, and illustrated by the arrow B, the gear wheel 105 drives the pinion 122 which drives in its turn the member 123 by means of the frictionally acting spring 124.

During its rotary movement, the member 123 drives the spindle 121 and therethrough the bell-shaped member 116 guiding the fishing line and this results in a winding of said fishing line round the spool 126.

The translational movement of the spindle 121 is obtained (FIG. 8) by the stud 125 secured to the wheel 105 at a point eccentric with reference to the axis of said wheel. The stud 125 gives the driving hub 125a reciprocating movement through the agency of the groove 126a formed in said hub 125a. When, as described hereinafter, the crank is caused to turn rearwardly so as to prepare a casting of the bait, the gear wheel 105 drives the pinion 122 without driving the member 123 by reason of the presence of the frictional spring 124.

The stud 125 on the gear wheel occupies a predetermined position with reference to a catch 107 to be described hereinafter, in a manner such that when said catch occupies the position illustrated in FIG. 6, the stud 125 lies in its extreme front position, which causes the bell-shaped member 116 guiding the fishing line to uncover to a maximum the spool 126 so as to allow the fishing line to pass outwardly in a easier manner at the moment of the casting of the bait.

The spool 126 is screwed on its hub 127 so as to allow its removal and its replacement when required. The spool hub 127 is fitted frictionally between a plate 128 and a washer 129. The plate 128 is held in a stationary position by three longitudinal bars 130 rigid with the dished member 101b, said plate being screwed onto said bars by three screws 131 as illustrated in FIG. 8. To the washer 129 is secured a further longitudinal bar 132 terminating with a threaded section 132a. A nut 133 screwed over said section compresses a spring 140 of which one end engages the washer 134 bearing against said nut while its other end engages the plate 128. The nut 133 is provided with two flat lateral surfaces 133a so as to allow its driving through the knob 135 revolvable inside the dish-shaped member 101b as shown at 101c. Elastic clamping means 136 prevent any risk of loss of said knob. The operation of the knob has for its result a compression or a release of the spring 140 so as to increase or to reduce the friction exerted on the spool hub 127.

The gear wheel 105 driven by the crank 106 carries on its surface facing away from its teeth the above-mentioned catch 107 privotally fitted on a stud 108. A step 109 is also secured to the toothed wheel 105 for cooperation with the catch.

A lever 110 pivotally secured at 111 to the casing is provided with a slot 110a and includes an extension forming a hook 110b the shank of which is formed by the body of said lever. Through said slot 110b there passes a stud 112 carried by a bar 113 rigidly secured at 114 to the hood 102.

The lever 110 carries furthermore a stud 141 cooperating with either side of a projection part 142a of a toggle spring 142, in a manner such that said lever may assume a stable position at each end of the path followed by it.

Figure 6:
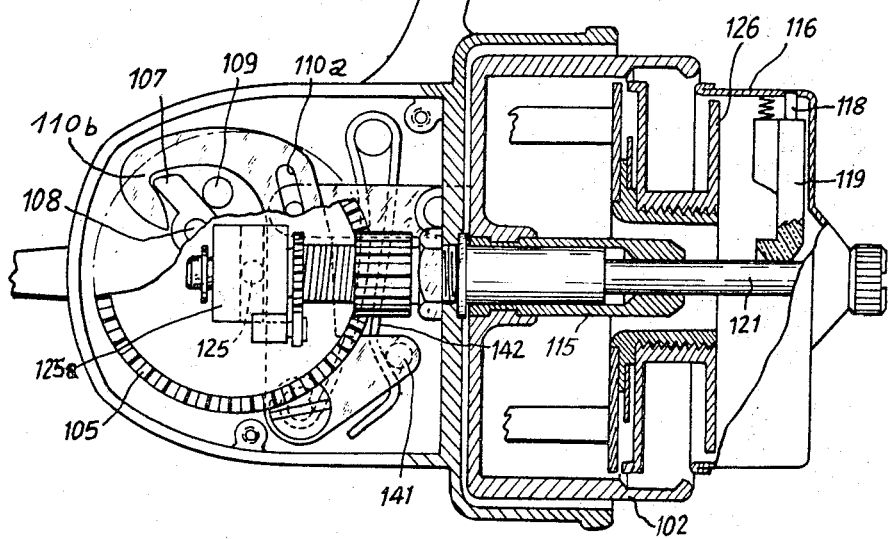

When the crank is caused to revolve rearwardly in a direction opposed to the normal direction ensuring the recovery of the fishing line, the catch 107 enters, under the action of gravity, a position for which it bears against the stop 109 and engages, as it passes in front of it, the hook 110b on the lever 110 (FIG. 6). The catch is held in this hook-engaging position by the stop 109. Upon continuation of the rotary movement of the wheel 105, the whole system constituted by the lever 110, the stud 112, the bar 113 and the hood 102 is caused to move so as to occupy the position illustrated in FIG. 6, the stud 141 riding during said movement over the projection 142a. The fishing reel is then ready for the casting of a bait.

When the crank is now caused to revolve in the normal direction corresponding to a recovery of the fishing line, the stop 109 pushes the rear edge of lever 110 which pushes in its turn the hood 102 by means of the bar 113. The hood 102 returns thus into the position illustrated in FIG. 5, the stud 141 riding over the projection 142a in the opposite direction so as to bring the hood into its forward stationary position. The fishing reel has thus returned into its position corresponding to a recovery of the fishing line.

The arrangement for positioning the radially movable projection 118 into its operative and inoperative positions is identical with that described with reference to the projection 10 in the embodiment illustrated in FIGS. 1 to 4.

When a traction is exerted on a fishing line, the latter has a tendency to carry along with it the bell-shaped member forming a guide for said fishing line in a direction opposed to that corresponding to a recovery of said fishing line and this results in that the rearward movement of the crank, the receding movement of the hood 102 and the collapsing of the projection 118 release the fishing line, which would form a serious drawback at the moment at which a fish is being drawn out of the water. In order to eliminate this drawback, there is provided a permanent non-return arrangement which includes a ratchet wheel 137 supported on the member on 123 and cooperating with a catch 138 (FIG. 5) held in position by a pin 139 secured to the member 125a.

What I claim is:

1. In a fishing reel for casting and winding in axially a fishing line, the combination of a spool around which the fishing line is adapted to be wound and provided with a front flange and with a rear flange, an axially reciprocable hood surrounding the spool with an annular gap between said spool and hood through which gap the fishing line is adapted to pass off and onto the spool, means mounting said hood to be shifted between a forward and a rearward position, means for urging the hood axially of the spool between said forward winding in position for which the hood extends beyond the front flange of the spool and means for moving the hood rearwardly into said rear casting position for which the front edge of the hood recedes to the rear of the front edge of the spool and an axially movable flyer means including radially projectable means adapted to lay the line on the spool when the hood is in its forward position.

2. In a fishing reel as claimed in claim 1, wherein the reciprocable hood is manually operable into its forward and rearward position.

3. In a fishing reel for casting and winding in axially a fishing line, the combination of a spool around which the fishing line is adapted to be wound and provided with front and rear flanges, a hood surrounding the spool with an annular gap between said spool and head, through which gap the fishing line is adapted to pass off and onto the spool, said hood adapted to be shifted forwardly and rearwardly, a casing carrying the spool, a rotary axially shiftable member facing the front flange of the spool and including line-guiding means registering with the outer periphery of the spool, means extending inside the casing and controlling the rotary and axial movements of said member and line-guiding means, said controlling means including a gear the axis of which is perpendicular to the axis of the spool, a bar rigid with the hood and extending rearwardly of the latter in an axial direction into the casing, a hook carried by the rear end of said bar and pivotally secured to the casing, means carried by the gear and adapted to cooperate with the hook to shift it in opposite directions upon rotation of the gear in opposite directions corresponding to the winding in and casting of the fishing line respectively to thereby urge the bar and hood forwardly and rearwardly respectively, the hood when urged into its forward position extending to the front of the front flange of the spool and, when urged into its rearward position, having its front edge lying to the rear of the front edge of the spool.

4. In a fishing reel for casting and winding in axially a fishing line, the combination of a spool around which the fishing line is adapted to be wound and provided with front and rear flanges, a hood surrounding the spool with an annular gap between said spool and hood, through which gap the fishing line is adapted to pass off and onto the spool, said hood adapted to be shifted forwardly and rearwardly, a casing carrying the spool, a rotary axially shiftable member facing the front flange of the spool and including line-guiding means coaxial with the outer periphery of the spool, means extending inside the casing and controlling the rotary and axial movements of said member and line-guiding means, said controlling means including a gear the axis of which is perpendicular to the axis of the spool, a bar rigid with the hood and extending rearwardly of the latter in an axial direction into the casing, a hook adapted to move between a rear extreme and a front extreme position along a fraction of the periphery of the gear, an arcuate shank rigid with the hook, flaring rearwardly, pivotally secured to the casing at a point located substantially in diametrically opposed relationship with reference to the mean position of the hook and provided with an elongated slot, a stud rigid with the rear end of the bar and engaging the slot to operatively connect the bar with the shank of the hook, means carried by the gear adapted to cooperate with the hook to shift it between its extreme positions upon rotation of the gear in opposite directions corresponding to the winding in and casting of the fishing line respectively to thereby urge the bar and hood forwardly and rearwardly respectively, the hood when urged into its forward position extending to the front of the front flange of the spool and, when urged into its rearward position, having its front edge lying to the rear of the front edge of the spool.

5. In a fishing reel for casting and winding in axially a fishing line, the combination of a spool around which the fishing line is adapted to be wound and provided with front and rear flanges, a hood surrounding the spool with an annular gap between said spool and hood, through which gap the fishing line is adapted to pass off and onto the spool, said hood being adapted to be shifted forwardly and rearwardly, a casing carrying the spool, a rotary axially shiftable member facing the front flange of the spool and including line-guiding means coaxial with the outer periphery of the spool, means extending inside the casing and controlling the rotary and axial movements of said member and line-guiding means, said controlling means including a gear the axis of which is perpendicular to the axis of the spool, a bar rigid with the hood and extending rearwardly of the latter in an axial direction into the casing, a hook carried by the rear end of said bar and pivotally secured to the casing, a catch pivotally secured to the gear and adapted to engage the hook upon rotation of the gear in a direction controlling the casting of the fishing line to thereby shift the bar rearwardly and thus set the hood in its rear position for which its front edge recedes to the rear of the front edge of the spool, a stud rigid with the gear to the rear of the catch in the direction of rotation of the gear controlling the casting of the fishing line, and adapted to engage the shank of the hook when the gear is rotated in the winding in direction to thereby shift the bar forwardly and thus set the hood in its forward position for which its front edge extends beyond the front flange of the spool.

6. In a fishing reel for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward and a rear position, a casing carrying the spool, a rotary axially shiftable member facing the front flange of the spool and including line-guiding means coaxial with the outer periphery of the spool, means extending inside the casing and controlling the rotary and axial movements of said member and line-guiding means, said controlling means including a gear the axis of which is perpendicular to the axis of the spool, a bar rigid with the hood and extending rearwardly of the latter in an axial direction into the casing, a hook adapted to move between a rear extreme and a front extreme position along a fraction of the periphery of the gear, an arcuate shank rigid with the hook, flaring rearwardly, pivotally secured to the casing at a point located substantially in diametrically opposed relationship with reference to the mean position of the hook and provided with an elongated slot, a stud rigid with the rear end of the bar and engaging the slot to operatively connect the bar with the shank of the hook, a spring blade secured to the casing and including a projecting section the opposite sides of which selectively engage the shank of the hook to hold said hook in each of its extreme positions respectively, means carried by the gear and adapted to cooperate with the hook to shift it between its extreme positions upon rotation of the gear in opposite directions corresponding to the winding in and casting of the fishing line respectively to thereby urge the bar and hood forwardly and rearwardly respectively, the hood when urged into its forward position extending to the front of the front flange of the spool and, when urged into its rearward position, having its front edge lying to the rear of the front edge of the spool.

7. In a fishing reel for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward and a rear position, a casing carrying the spool, a rotary axially shiftable member facing the front flange of the spool and including line-guiding means coaxial with the outer periphery of the spool, means extending inside the casing and controlling the rotary and axial movements of said member and line-guiding means, said controlling means including a gear the axis of which is perpendicular to the axis of the spool, a bar rigid with the hood and extending rearwardly of the latter in an axial direction into the casing, a hook adapted to move between a rear extreme and a front extreme position along a fraction of the periphery of the gear, an arcuate shank rigid with the hook, flaring rearwardly, pivotally secured to the casing at a point located substantially in diametrically opposed relationship with reference to the mean position of the hook and provided with an elongated slot, a stud rigid with the rear end of the bar and engaging the slot to operatively connect the bar with the shank of the hook, a cam secured to the front of the shank of the hook, a spring blade secured to the casing and including a projecting section the opposite sides of which selectively engage said cam to hold the hook in each of its extreme positions respectively, means carried by the gear and adapted to cooperate with the hook to shift it between its extreme positions upon rotation of the gear in opposite directions corresponding to the winding in and casting of the fishing line respectively to thereby urge the bar and hood forwardly and rearwardly respectively, the hood when urged into its forward position extending to the front of the front flange of the spool and, when urged into its rear position, having its front edge lying to the rear of the front edge of the spool.

8. In a fishing reel, for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward spool-concealing position and a rear position uncovering the front flange, a casing carrying the spool, a rotary axially shiftable member facing the front flange of the spool and including line-guiding means coaxial with the outer periphery of the spool, means extending inside the casing and controlling the rotary and axial movements of said member and line-guiding means, a spring urging the hood into its forward position, means for urging the hood back into its rear position, a bar rigid with the hood, extending rearwardly of the latter in an axial direction into the casing and provided with a lateral notch, and a catch pivotally secured to the casing and adapted to engage the notch to thereby hold the hood in its rear position.

9. In a fishing reel for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward spool-concealing position and a rear position uncovering the front flange, a casing carrying the spool, a rotary axially shiftable member facing the front flange of the spool and including line-guiding means coaxial with the outer periphery of the spool, means extending inside the casing and controlling the rotary and axial movements of said member and line-guiding means, said controlling means including a gear parallel with the axis of the spool, a stud eccentrically rigid with the gear, a spring urging the hood into its forward position, means for urging the hood back into its rear position, a bar rigid with the hood, extending rearwardly of the latter in an axial direction into the casing and provided with a lateral notch, a catch pivotally secured to the casing and adapted to engage the notch to thereby hold the hood in its rear position and a cam rigid with the catch and adapted to be engaged by the stud on the gear to thereby lift the catch out of the cooperating notch to release the bar and allow the spring to urge the hood into its forward position.

10. In a fishing reel for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward and a rear position, a rotary bell-shaped member capping the front end of the spool, a rotary and axially shiftable spindle extending axially of the spool and carrying said bell-shaped member, a casing carrying the spool, a gearing carried by the casing and controlling said spindle, a sleeve rigid with the hood, fitted coaxially round said spindle and including a terminal cam-shaped section, a pin adapted to guide the fishing line during the winding in of the latter, carried in a radially projectable position at the periphery of the rotary bell-shaped member, a spring urging said pin into its withdrawn position means wherethrough the cam-shaped section of the sleeve constrains the said pin to enter its projected position when the hood and sleeve have entered their forward position and means for moving the hood axially of the spool between said forward winding in position for which the hood extends beyond the front flange of the spool and said rear casting position for which the front edge of the hood recedes to the rear of the front edge of the spool.

11. In a fishing reel for casting and winding in axially a fishing line, the combination of a spool around which the fishing line is adapted to be wound and provided with a front flange and with a rear flange, a hood surrounding the spool with an annular gap between said spool and hood, through which gap the fishing line is adapted to pass off and onto the spool, said hood being adapted to be shifted between a forward and a rear position, a rotary flyer member capping the front end of the spool and including a centrally apertured transverse partition, a rotary and axially shiftable spindle extending axially of the spool and carrying said flyer member, a casing carrying the spool, a gearing carried by the casing and controlling said spindle, a sleeve rigid with the hood, fitted coaxially around said spindle and including a terminal frustoconical forwardly tapering front section engageable in the central aperture in the transverse partition of the hood, a pin adapted to guide the fishing line during the winding in of the latter, carried in a radially projectable position at the periphery of the rotary flyer member, a spring urging said pin into retracted position, a member extending substantially along the axis of the bell-shaped member and adapted to slide between a position registering with said central aperture and an outer position for which it shifts the pin outwardly into its operative position, the outward sliding movement of last-mentioned member being produced by the forward movement of the hood and sleeve the front section of which sleeve engages then said central aperture to urge said last-mentioned member towards its outer position and means for urging the hood axially of the spool between said forward winding in position for which the hood extends beyond the front flange of the spool and said rear casting position for which the front edge of the hood recedes to the rear of the front edge of the spool.

References Cited
UNITED STATES PATENTS

| | | | |
|---|---|---|---|
| 2,600,558 | 6/1952 | Mauborgne | 242—84.21 |
| 2,652,990 | 9/1953 | Ferguson | 242—84.2 |
| 3,105,650 | 10/1963 | Kuether | 242—84.2 |
| 3,222,009 | 12/1965 | Saral | 242—84.21 |
| 3,253,801 | 5/1966 | Rouanet | 252—84.21 |

FRANK J. COHEN, *Primary Examiner.*

BILLY S. TAYLOR, *Examiner.*